United States [11] 3,629,834

[72] Inventors William E. Randall
67, Sunnyfield, Mill Hill, London, N.W.7;
Geoffrey Ernest Patrick Constable, Withy
Furlong, Malleson Road, Gotherington,
Cheltenham, Gloucestershire, both of
England
[21] Appl. No. 851,301
[22] Filed Aug. 19, 1969
[45] Patented Dec. 21, 1971
[73] Assignee Chubb & Son's Lock and Safe Company
Limited; Smiths Industries Limited;
Cricklewood Works, all of London,
England, a part interest to each
[32] Priority Aug. 30, 1968
[33] Great Britain
[31] 41,423/68

[54] ACCESS-CONTROL EQUIPMENT AND ITEM-
DISPENSING SYSTEMS CONTROLLED BY
CREDIT CARD
14 Claims, 6 Drawing Figs.

[52] U.S. Cl. ..................................................... 340/149,
221/13
[51] Int. Cl. ....................................................... H04q 1/00,
H04q 3/00
[50] Field of Search ........................................... 340/149 A,
149

[56] References Cited
UNITED STATES PATENTS
3,061,143 10/1962 Simjian .......................... 221/2
3,184,714 5/1965 Brown ........................... 340/149 A
3,221,304 11/1965 Enikeieff ....................... 340/149 A
3,401,830 9/1968 Mathews ....................... 221/2

Primary Examiner—Harold I. Pitts
Attorneys—William D. Hall, Elliott I. Pollock, Fred C. Philpitt, George Vande Sande, Charles F. Steininger and Robert R. Priddy ABSTRACT: A money-dispensing system is operative to dispense money in response to a bank customer's embossed credit card and keyed entry of his personal identification number, only if this number accords with the customer's account number as read from an accounting record impressed from the card. Accord is checked at the bank's central computer and approval for dispensing, and return of the card to the customer, is given by an encyphered signal transmitted back to the dispensing terminal. The card is returned to the customer, whether or not he is successful in achieving the accord necessary for dispensing, only if the card carries an authentic magnetic recording and has not expired. If the card does not carry the recording, or has expired, dispensing is in all cases inhibited and the card is transported into a bin that is out of reach of the customer for retention until the machine is serviced by bank staff.

INVENTORS:
W. E. RANDALL &
G. E. P. CONSTABLE
BY: [signature]
ATTORNEY

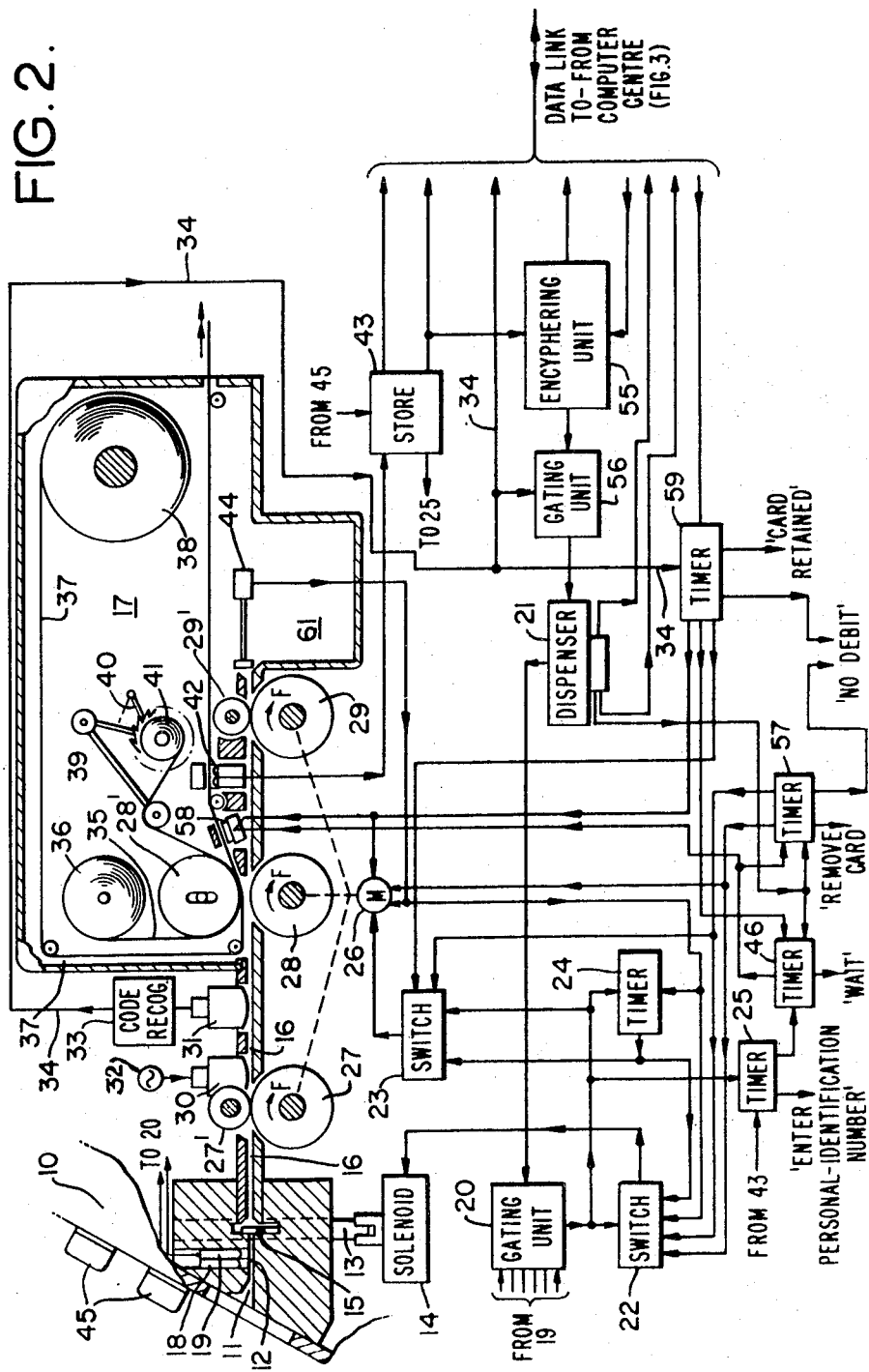

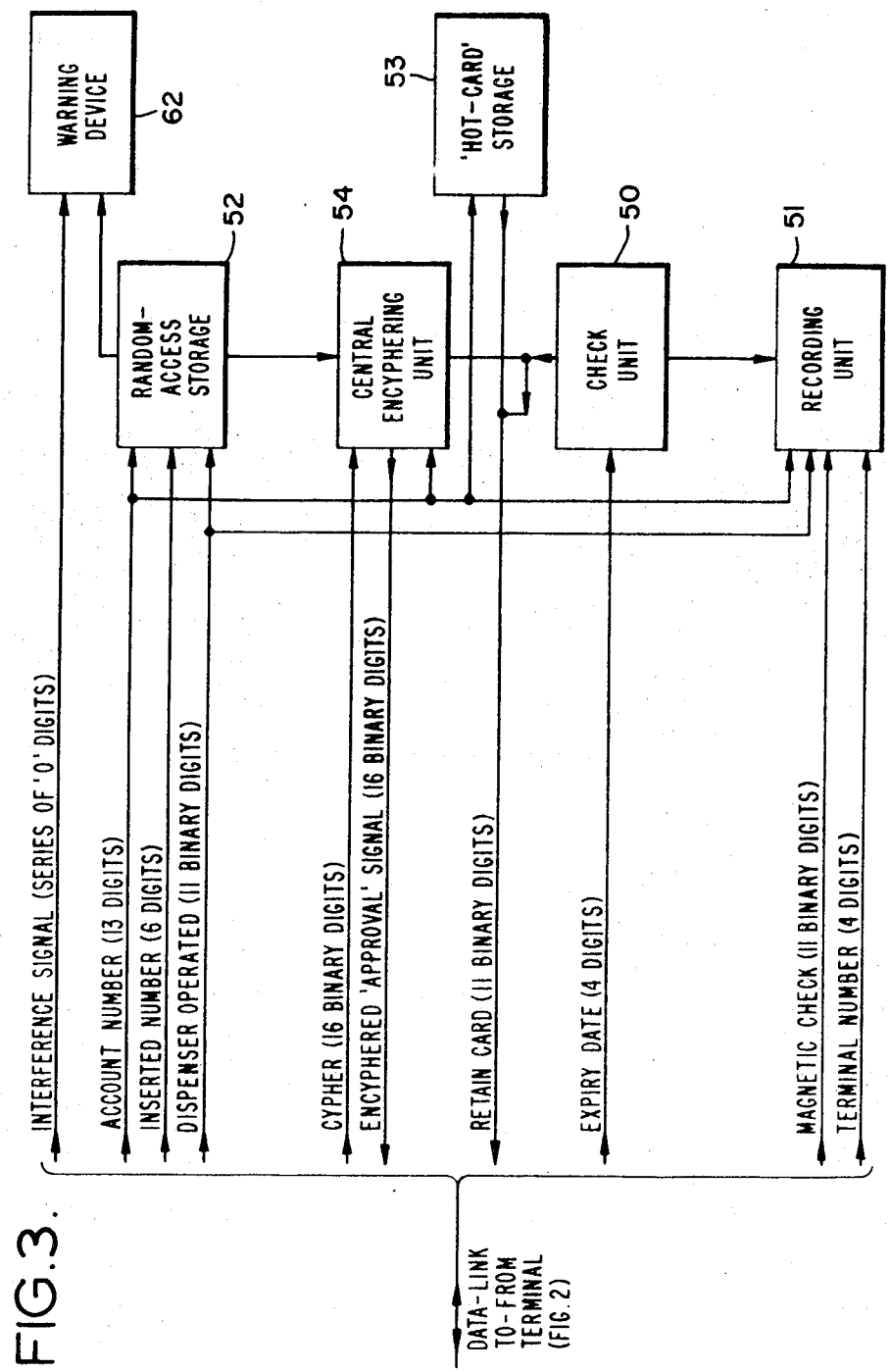

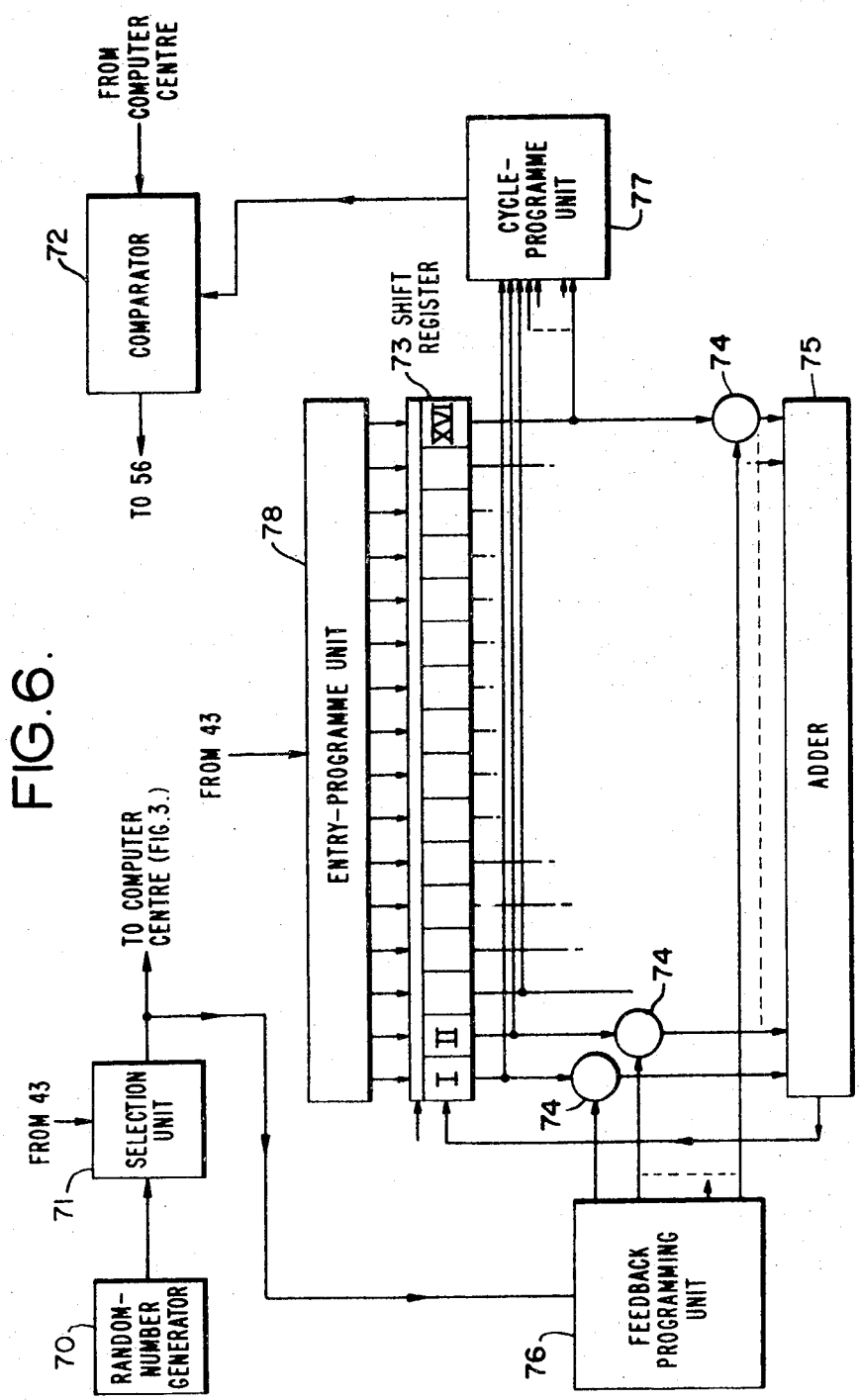

3,629,834

ACCESS-CONTROL EQUIPMENT AND ITEM-DISPENSING SYSTEMS CONTROLLED BY CREDIT CARD

SUMMARY OF THE INVENTION

This invention relates to access-control equipment and item-dispensing systems including such equipment.

The invention is especially concerned with access-control equipment of the kind that selectively enables access to a facility, under control of a coded token. The coded token may, for example, be in the form of a punched or embossed card, each person authorized to make use of the facility being issued with such a card for presentation to the equipment when access is required.

According to the present invention, access-control equipment for selectively enabling access to a facility, comprises first means for receiving a coded token presented to the equipment by a person seeking access to said facility, second means for reading from the received token information encoded thereon, third means that is operable in dependence upon the information read from the token to enable access to said facility, fourth means for detecting whether the received token has a predetermined characteristic, the existence of said predetermined characteristic (which may be part, at least, of the information read from the token) being a criterion of valid access, and fifth means that is operable to return the token received by said first means to said person only in the event that said predetermined characteristic is detected by said fourth means.

The predetermined characteristic may be a magnetic characteristic, and in particular the said fourth means may be arranged to detect whether the received token carries a magnetic recording. In the latter circumstances each authentic token for use with the equipment will involve magnetic material that carries the relevant magnetic recording, and by providing that the coercivity of this material is not less than some predetermined level, it is possible to incorporate into the equipment an added feature making fraudulent operation more difficult. To this end said fourth means may include erasure means for submitting the token received by the equipment to a magnetic-erasure process that will erase magnetic recording from any magnetic material having less than the authentic level of coercivity, and detecting means for detecting magnetic recording remaining on the token after the token has been submitted to the erasure process, the arrangement being such that operation of said fifth means to effect return of the token, and also of said third means to enable access to said facility, is inhibited in the event that a magnetic recording is not detected by the detecting means. Clearly with this arrangement, operation of the said fifth means to effect return of the token, and of said third means to enable access, is conditional not only upon the received token having the required recording but also upon this recording being carried by material of sufficient coercivity.

Alternatively, or in addition, the said predetermined characteristic may involve information encoded on the token and relating, for example, to the expiry date of the token, the said fourth means in these circumstances being arranged to detect from the token whether it has the characteristic of an expiry date that has not yet passed, and said fifth means then being operable to return the token only in the event that this 'in-force' characteristic is detected.

The equipment may include means that is operable manually for entering into the equipment a plural-character word, the particular word entered being dependent upon manual selection, and in these circumstances it may be arranged that the said third means is operable to enable access only in the event that there is a predetermined correspondence between the said information read from the token and the word entered into the equipment manually. The encoded information read from the token may be individual to the person to whom the token has been issued, and in these circumstances said predetermined correspondence may be arranged to exist, and access to said facility may be enabled, only if there is a predetermined correspondence between the plural-character word entered manually, and the encoded information.

The means for reading information encoded on the token may include means for providing a record of the information encoded on the token, and in these circumstances operation of said third means to enable access may be arranged to be dependent upon the encoded information as read from the record rather than directly from the token. For example, where the token carries information encoded in the form of embossings, the operation of said third means may be arranged to be dependent upon the information as read by a photoelectric reader from an imprint of the embossings made in ink on paper tape or other record material.

The access-control equipment may be arranged to enable selectively, access to any form of facility, for example, entry to a restricted area, use of a service, or withdrawal of an item or product (in predetermined or selected quantity). One particular application of the equipment is in the field of banking where a money-dispensing system is provided for use by customers at all times, the customers being issued with individual coded tokens for presentation to any one of a plurality of money-dispensing terminals of the system when withdrawal of money is required. The equipment of the present invention in this latter connection may be arranged to control a money-dispenser so that money (for example, in banknote form) is dispensed to the customer in response to each valid 'request' for withdrawal, a valid 'request' in this context involving, at least, presentation to the equipment of an authentic token.

According to a feature of the present invention, an item-dispensing system comprises means providing an entrance to the system for a coded token, token-reading means spaced from said entrance, a token-transport arrangement which is for transporting a token admitted to the system through said entrance to the token-reading means and which is operable selectively to return the token from the token-reading means to said entrance, said token-reading means being arranged to read from a token transported thereto information encoded on the token, means which is operable manually for entering a number into the system, the particular number entered being dependent upon manual selection, item-dispensing means that is selectively operable to dispense from a reserve of items at least one such item upon each operation of the item-dispensing means, comparison means arranged to compare a number dependent upon the information read from the token with the said number entered into the system, said comparison means being arranged to operate said item-dispensing means to dispense at least one of said items as aforesaid in dependence upon whether a predetermined correspondence exists between the compared numbers, and detector means for detecting whether the received token has a predetermined characteristic, the existence of said predetermined characteristic (which may be part, at least, of the information read from the token) being a criterion of validity of the token, and the arrangement being such that operation of said item-dispensing means, and of said token-transport arrangement to return the token to said entrance, is inhibited in the event that said predetermined characteristic is not detected by said detector means.

BRIEF DESCRIPTION OF THE DRAWINGS

An item-dispensing system in accordance with the present invention will now be described, by way of example, with reference to the accompanying drawings, in which:

FIG. 2 is a schematic representation of part of the item-dispensing system used for receiving and selectively admitting coded tokens to the system;

FIG. 3 is a generalized schematic representation of electronic circuits forming part of the item-dispensing system and used in conjunction with the arrangement of FIG. 2;

FIG. 6 is a schematic representation of encyphering equipment as used in the arrangement of FIG. 2.

DESCRIPTION OF THE PREFERRED EMBODIMENTS

Figure 1:
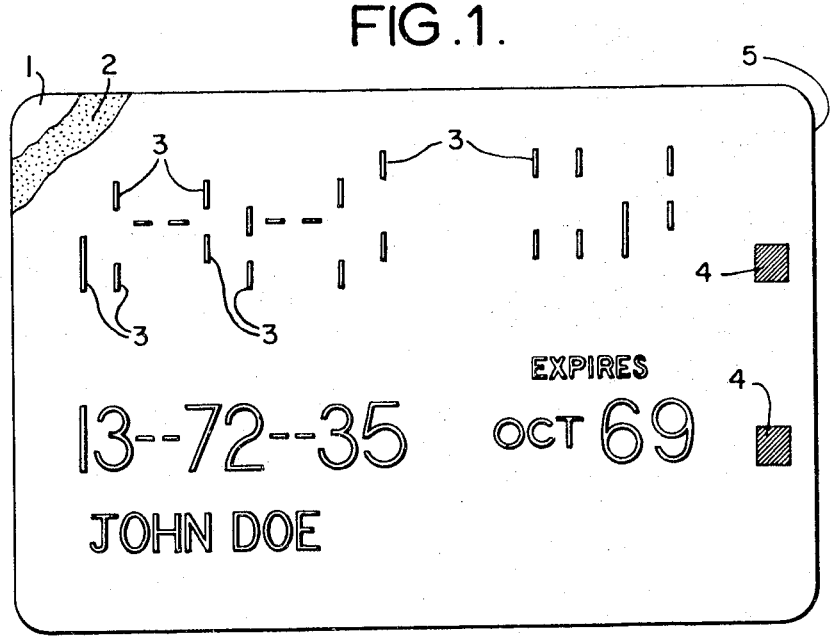
FIG. 1 shows the form of a coded token used with the item-dispensing system.

The system to be described is for use in dispensing packets of banknotes, one at a time, to customers of a bank, and is for use after, as well as during, normal banking hours. The customers authorized to use the system are each issued with a coded token in the form of a plastics card that may be used generally as a credit card. Each card bears a date of expiry and numerical information identifying the account of the customer to whom the card has been issued, and this information, as well as being embossed directly on the card, is embossed thereon in coded form. The customer is informed of a secret, personal identification number that is individual to his account but cannot be deduced from the card itself. When the customer wishes to withdraw a packet of banknotes, he simply presents his card to a card-reception unit of the system at a branch of the bank, and operates a set of 10 pushbuttons in accordance with his personal identification number. The system records the information from the card for accounting and auditing purposes, and in return automatically dispenses to the customer one packet of banknotes. The packet of banknotes is dispensed to the customer from a dispenser that is individually associated with the card-reception unit and holds a supply of such packets, the dispenser being released to dispense the packet only after the validity of the transaction has been checked. In this respect the system checks the authenticity of the card, and then that the number entered manually by the customer is the number appropriate to the account identified by the card, that the card is still in force, and that the customer's account can accommodate the withdrawal. These latter checks are carried out at a central station or 'computer center' that is common to a series of 'terminals' that each involve a card-reception unit and associated dispenser; the terminals may readily be located at different, widely spaced branches of the bank.

Information relating to the status of account of each bank customer issued with a card, is stored at the computer center together with the secret personal identification numbers appropriate to these accounts. Communication between the computer center and the card-reception units at the different terminals is made by means of binary coded signals transmitted via a conventional form of data link. Generally speaking the encoding of the signals transmitted over the data link in respect of any transaction is conventional, there being special steps taken for security purposes to encypher one signal only, namely, a signal that is transmitted from the computer center to the relevant terminal in order to signify approval of release of the dispenser to dispense a packet of banknotes.

When a customer at any terminal is dispensed a packet of banknotes, his account as recorded at the computer center is debited with the amount of the withdrawal. The card-reception unit at the terminal then acts to return the card to the customer for further use as desired. The card used is not returned (and no dispensing of course takes place), however, in the event that it is not authentic, or has expired or is otherwise invalid; in each of these circumstances the card is retained within the card-reception unit and is then recoverable by bank officials only. The form of authentic card issued to bank customers is shown in FIG. 1.

Referring to FIG. 1, each card is formed by a rectangular substrate 1 of opaque plastics material that is shielded on either face by transparent vinyl film. The card, which carries a magnetic coating 2 beneath printing and other artwork on its obverse face (shown in FIG. 1), is embossed with the customer's name and account number and with the date of expiry of the card. The account number and date of expiry are also encoded on the card using bar characters 3 that are embossed on the substrate 1 in a two-out-of-five positional code, these characters together with the characters of the other embossings all protruding from the obverse face of the card. Two small dark markings 4 are provided at spaced intervals from one another across the width of the card at a designated leading and 5, these like the magnetic coating 2, being provided for security purposes.

The magnetic coating 2 on the card involves two magnetic oxides of high- and low-coercivity respectively, the magnetic oxides being provided either in separate layers, with the layer of high-coercivity material extending in a band across the width of the substrate 1 beneath the other layer, or as an admixture of the two materials. A series of pulses is recorded in the high-coercivity material, the individual pulse recordings being made at positions within the coating 2 spaced from one another lengthwise of the card. For security purposes, the low-coercivity material carries a magnetic recording that extends over substantially the whole area of the coating 2 and serves to provide 'noise' masking the pulse recordings from easy detection.

The authenticity of each card presented to the system is checked, firstly by detecting whether the card has appropriately located markings 4, and then by detecting whether it carries an appropriate series of pulse recordings in the coating 2. These checks are performed by the card-reception unit represented in FIG. 2.

Referring to FIG. 2, the card-reception unit has a facia 10 that is mounted in an external wall of the bank, and has a readily accessible mouth 11 for receiving the customer's card. The mouth 11 within the unit converges to a throat portion 12 that is normally blocked at its far end by a movable shutter 13. An electrical solenoid 14 controls the shutter 13, the solenoid 14 when energized moving the shutter 13 upwardly against a spring bias to bring a gate aperture 15 through the shutter 13, into alignment with the throat portion 12. This opens the way for the card to pass through the portion 12 into a guideway 16 that leads to a card-reading cassette 17. The shutter 13 remains in this open position only so long as the solenoid 14 is energized, and is otherwise returned and held by the spring bias in the closed position in which the way into the guideway 16 is completely blocked.

The customer presents his card to the card-reception unit by inserting the end 5 into the exposed mouth 11 with the coating 2 uppermost. The end 5 is inserted through the mouth 11 into the throat portion 12 to abut the closed shutter 13. In this position of the card the set of markings 4 lie beneath lamps 18 (of which only one is shown) that are continuously energized to direct light downwardly across the throat portion 12 for reflection back to individual photoelectric cells 19. The photoelectric cells 19 (of which downwardly one is shown) are disposed at spaced intervals from one another across the width of the throat portion 12, and, until a card is inserted in the throat portion 12, each cell 19 receives light from its associated lamp 18 and in response thereto supplies an electric signal to an electrical gating unit 20.

The unit 20 is responsive only to the condition in which signals are supplied by a certain combination of the photoelectric cells 19 and not by the remainder. This condition exists only when a card with the corresponding number of appropriately located markings 4 is presented to the card-reception unit with the end 5 leading and with the coating 2 uppermost, reflection of light to those of the cells 19 that are in register with the markings 4 being interrupted, and to the remainder continuing by virtue of the absence of markings 4 elsewhere across the width. Response of the gating unit 20 to this condition is, however, effective to produce an output signal from the unit 20 only in the circumstances in which an enabling signal is supplied to the unit 20 from the dispenser 21 of the terminal. The dispenser 21 supplies the enabling signal to the unit 20 only so long as there is still a packet of bank notes available therein. If no enabling signal is supplied from the dispenser 21, there is no output signal from the unit 20, and an EMPTY sign (not shown) on the facia 10 of the card-reception unit is illuminated. The EMPTY sign is illuminated (by means not shown) throughout any period for which the enabling signal is not supplied by the dispenser 21, so as to warn customers that the system is not operative. The absence of the enabling signal from the dispenser 21 has the effect of inhibiting operation of the whole system, since the system is then incapable of responding even when presented with an authentic card.

When there is response of the unit 20 in the presence of the enabling signal from the dispenser 21, the output signal supplied by the unit 20 is passed to switch ON a switch unit 22 that controls the supply of electrical energization current to the solenoid 14. The output signal is also supplied to switch ON a switch unit 23, and to start operation of two timers 24 and 25. The switch unit 23 controls the supply of electrical energization current to a reversible electric motor 26 that drives three card-transport rollers 27 to 29 that project into the guideway 16 at spaced intervals therealong. The switching ON of the units 22 and 23 serves to energize both the solenoid 14 and the motor 26, with the result that the shutter 13 moves upwardly to admit the card through the gate aperture 15 into the guideway 16, and the rollers 27 to 29 rotate in their forward senses indicated by the arrows F. The card admitted through the gate aperture 15 is fed by the customer into the guideway 16 until the leading end 5 reaches the rotating roller 27. An idling roller 27' is urged resiliently and downwardly into contact with the roller 27 so that when the end 5 reaches the roller 27 the card is drawn lengthwise completely into the card-reception unit. The card is drawn in between the rollers 27 and 27' to be fed along the guideway 16 towards the rotating roller 28. The end 5 eventually enters between the roller 28 and an associated pinch roller 28' at the entrance to the reading cassette 17. The card is accordingly drawn lengthwise from the roller 27 and 27' and is passed further on along the guideway 16 towards the rotating roller 29 positioned at the far end of the cassette 17.

The card, in its passage along the guideway 16 from the roller 27 to the roller 28, passes successively beneath a magnetic-recording head 30 and a magnetic-reading head 31 that both project into the guideway 16. The head 30 is energized with alternating current that is supplied from a source 32 to erase the 'noise' which in an authentic card is recorded over the pulse recordings in the coating 2. The frequency and amplitude of this alternating current are so chosen that the magnetic flux produced by the head 30 is well capable of erasing the 'noise' recorded in the low-coercivity material, but is nonetheless insufficient to affect the pulse recordings recorded in the high-coercivity material.

The erasure of the 'noise' masking the pulse recordings enables these recordings to be read in turn from the coating 2 by the head 31 as the card is fed lengthwise from the rollers 27 and 27'. The sensed pulse recordings give rise to a series of pulse signals which are passed from the head 31 to be counted by a code-recognition unit 33. The unit 33 detects whether the number of pulse signals counted is the same as the number of pulse recordings provided on each authentic card, and the only if it is, provides on a lead 34 an output signal indicative of this fact. This output signal, the existence of which is an essential for release of the dispenser 21 to dispense a packet of banknotes, persists after the card has passed on to the roller 28 and until the unit 33 is eventually reset.

The card in being driven by the rollers 27 and 27' to the roller 28 actuates a microswitch and this serves to energize a solenoid that acts via an operating fork (the microswitch, solenoid and fork are not shown) to lower the pinch roller 28' downwardly as the end 5 of the card reaches the roller 28 at the entrance to the cassette 17. The roller 28' is in this way pressed downwardly on to an inked ('Mylar') ribbon 35 that is fed from a supply spool 36 to pass between the roller 28' and a paper tape 37. The tape 37, which is fed within the cassette 17 from a supply spool 38, is pressed under the ribbon 35 against the obverse face of the card in the guideway 16. As the card is drawn lengthwise through the rollers 28 and 28' with the ribbon 35 and tape 37, so the tape 37 is imprinted in ink with the embossings of the card. The length of ribbon 35 passed is taken up by a sprung arm 39 the pivoting of which operates a ratchet 40 to cause a very small fraction of this length to be wound on a takeup spool 41, the remainder returning to the spool 36 for use again, when the roller 28' is subsequently lifted (as referred to later). The paper tape 37 imprinted with the embossings of the card, on the other hand, passes out from the cassette 17 via a photoelectric reader 42 that reads from the tape 37 the imprint made by the bar-characters 3 and supplies signals in accordance with the encoded account number and expiry date to a store 43.

The leading end 5 of the card driven from between the rollers 28 and 28', enters between the rotating roller 29 and an associated idling roller 29' that is urged downwardly and resiliently onto the roller 29. On passing from between the rollers 29 and 29' the end 5 actuates a microswitch 44 and thereby causes an electric signal to be supplied to switch OFF the unit 22 and to terminate operation of the timer 24. The switching OFF of the unit 22 breaks the supply of energization current to the solenoid 14 with the result that the shutter 13 closes. The timer 24 is arranged to supply a signal to the unit 22 to have the same effect as this, in the event that a preset period of operation of the timer 24 expires before receipt of the signal from the microswitch 44. In this latter respect, the timer 24 is preset to run for a period adequate to allow the card to be transported along the guideway 16 into the card-reading cassette 17. Operation of the timer 24 to run for this period is started, as referred to above, by the output signal from the gating unit 20 immediately preceding admission of the card to the guideway 16. If within this period there is no signal from the microswitch 44 (that is to say, if there is no signal to signify that the card has fully entered the cassette 17), then the timer 24 supplies an output signal that has the effect of inhibiting further operation of the system. This output signal from the timer 24, as well as being supplied to the unit 22 to result in closure of the shutter 13, is supplied to switch OFF the unit 23 and thereby break energization of the motor 26. The operation of the timer 24 to produce this output signal is inhibited however, when in the normal course of events there is actuation of the microswitch 44 before expiry of the preset period.

The signal supplied to the timer 24 and unit 22 upon actuation of the microswitch 44 is supplied to break drive from the motor 26 to the rollers 27 to 29, so that once the microswitch 44 is actuated, drive to the card ceases. The card is restrained from movement in these circumstances by virtue of the pressure of the rollers 28' and 29' holding it against the stationary rollers 28 and 29.

Operation of the timer 25, started in response to the output signal of the gating unit 20, causes illumination of a second sign on the facia 10. The sign signifies ENTER PERSONAL-IDENTIFICATION NUMBER, and illumination of this directs the customer to enter his appropriate personal identification number using a set of 10 pushbuttons 45 (only two of which are shown) mounted in four rows on the facia 10. The personal identification number is in each case a decimal number of six digits. The 10 pushbuttons 45 are accordingly numbered with the ten decimal digits 0 to 9 respectively, the six digits of the number being entered in order operating one pushbutton 45 at a time. The six-digit number entered in this way is stored in the store 43 and results in application of a signal to terminate operation of the timer 25. Termination of this operation causes illumination of the second sign to be extinguished and starts operation of a timer 46 to illuminate a third sign on the facia 10, signifying WAIT. In addition, the information that is stored in the store 43 and relates to the customer's account number and card expiry date read from the card via the tape 37, is now transmitted to the computer center shown in FIG. 3.

Referring to FIG. 3, the information from the store 43 is transmitted to the computer center together with digital representations of the signal appearing on the lead 34 and the identification number of the money-dispensing terminal involved. The information relating to the expiry date is checked in a check unit 50 at the computer center to ensure that the card is still in force, whereas the other transmitted information is recorded in a recording unit 51 for accounting and security-checking purposes. The account number is also used at the computer center to address two storage units, one a main, random-access storage unit 52 that stores the personal identification numbers associated with the respective account numbers and details of the status of each account, and the other a so-called hot-card storage unit 53 that stores the account numbers of customer's cards that are no longer valid (for example, cards that have been lost or stolen). The addressing of the main storage unit 52 by the account number reveals the status of the account and the six-digit personal identification number that is to be entered by the customer using the card. The number actually entered by the customer, as stored by the stores 43 (FIG. 2), is transmitted to the computer center together with a 16-digit binary cypher that is derived at the terminal by an encyphering unit 55 (FIG. 2), the entered number being supplied to the storage unit 52 and the cypher to a central encyphering unit 54. In the storage unit 52 the entered personal identification number is compared for equality with the personal identification number revealed by the account number identified from the terminal. If equality exists and the status of the account can accommodate withdrawal, a signal to this effect is passed from the unit 52 to the unit 54. (It may be useful to transmit back to the terminal from the unit 54 signals for use in giving the customer an indication of the status of his account; in particular it may be arranged that a sign on the facia 10 signifying ACCOUNT LEVEL LOW is illuminated in the event that the status of the account can accommodate only a few further transactions.)

The encyphering unit 54 transmits to the terminal a signal signifying approval of the dispensing operation, only in response to the signal from the storage unit 52 and confirmation from the check carried out by the unit 50 that the card at the terminal is still in force. This 'approval' signal is transmitted to the terminal in a form determined by the cypher received from the unit 55, and at the terminal is recognized by the unit 55. When recognized by the unit 55 the 'approval' signal causes the application of a 'dispense' signal to a gating unit 56 (FIG. 2) that receives the signal on the lead 34. The 'dispense' signal at the terminal is passed on from the unit 56 to the dispenser 21 only in the event that the signal on the lead 34 signifies that the card has satisfied the magnetic check performed using the heads 30 and 31. The dispenser 21 dispenses one packet of banknotes to the customer on reception of the 'dispense' signal and transmits a signal signifying this to the storage unit 52 at the computer center for use in debiting the customer's account. At the same time the dispenser 21 supplies a signal to terminate operation of the timer 46 and thereby extinguish the WAIT sign, and to start operation of a further timer 57.

The timer 57 after running for a few seconds, acts to cause reenergization of the solenoid 14 by switching ON the unit 22, and reengagement of the drive from the motor 26 to the rollers 27 to 29. Drive to the rollers 27 to 29 is reengaged in the reverse sense so that the card is returned along the guideway 16 to pass through the reopened shutter 13; during this reverse movement of the card the roller 28' is lifted away from the roller 28 so that no movement or imprinting of the paper tape 37 takes place (drive pressure is maintained on the card as it passes over the roller 28 at this time by small rollers on either side of the pinch roller 28'). A further sign on the facia 10 is at this time illuminated to signify REMOVE CARD to the customer. The full operating period of the timer 57 is such as to give the customer adequate time to remove the returned card from the mouth 11 (it may be readily arranged, however, that the period continues to run until there is in fact removal of the returned card). At the end of this full period the sign REMOVE CARD is extinguished and a signal is passed from the timer 57 to switch OFF both units 22 and 23 so that energization of both the solenoid 14 and motor 26 ceases. The card-reception unit, and the terminal equipment as a whole, is now reset in readiness for presentation of the same or another card to the mouth 11.

It has been assumed above that the 'approval' signal is received by the cash-dispensing terminal. No such signal is sent from the computer center in the event of one or more of the circumstances in which (a) correspondence with the personal identification number stored against the account number in the unit 52 is not detected, (b) the status of the account as recorded in the unit 52 cannot accommodate a withdrawal, and (c) the unit 50 detects that the card at the terminal is no longer in force. In either of circumstances (a) and (b) the timer 46 runs for its full period; at the end of this period the sign WAIT is extinguished and the timer 57 is operated to return the card to the customer and illuminate the sign REMOVE CARD, in the same manner as described above. Another sign on the facia 10 is in this case illuminated with the sign REMOVE CARD, to signify NO DEBIT, and an electromagnetically operated hammer 58, adjacent the photoelectric reader 42, is energized to make an imprint on the paper tape 37 and thereby signify against the record of the card that the dispenser 21 has not been operated.

In circumstance (c), as with circumstances (a) and (b), no 'approval' signal is transmitted to the terminal, but in this case a signal is transmitted from the check unit 50 to a timer 59 at the terminal. The same signal is transmitted from the computer center to set the timer 59 in operation in the event that the account number transmitted to the computer center corresponds to one of the numbers stored in the hot-card storage unit 53. The timer 59 is also set in operation from within the terminal itself, in the event that the signal condition of the lead 34 indicates that the card has not satisfied the magnetic check performed using the heads 30 and 31.

The timer 59 when set in operation acts to terminate operation of the timer 46, and after running for a few seconds acts to reengage the motor 26 to drive the rollers 27 to 29 in the forward sense so that the card is driven from within the cassette 17 into a bin 61 at the rear of the card-reception unit; the card in the bin 61 can be retrieved by bank officials only, and not by the customer. At this time the timer 59 also energizes the electromagnetically operated hammer 58 to make an imprint on the paper tape 37 signifying that the dispenser has not been operated. In addition the timer 59 acts to illuminate the sign NO DEBIT concurrently with another sign on the facia 10 signifying CARD RETAINED. At the end of the full period of the timer 59, these two signs are extinguished and a signal is passed to switch OFF the unit 23 so that energization of the motor 26 ceases, the whole terminal equipment being now reset in readiness for presentation of another card to the mouth 11.

Provision is made at the computer center for giving warning of interference with, or malfunction of, the terminal equipment. In particular a signal is passed from the unit 52 to a warning device 62 at the computer center in the event that after an 'approval' signal has been transmitted from the unit 54 no return signal is received from the dispenser 21 to indicate that dispensing has taken place. In addition the dispenser 21 transmits a similar signal to the device 62 in the event that there is attack on, or other interference with, the equipment (in particular the dispenser 21) at the terminal. Provision may also be made for warning to be given in the event that the unit 52 detects that repeated attempts are being made with the same card to achieve operation of the dispenser 21 using experimental personal identification numbers; a signal may in these circumstances be transmitted to the timer 59 so that the card is then retained. Generally speaking there is continuous transmission of a signal level from the terminal to the computer center such that any failure in power supply at the terminal, or communication with the center, will be detected immediately.

Figure 4:
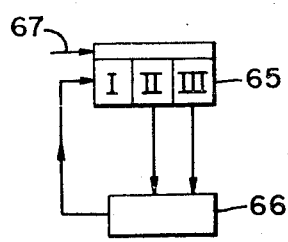
FIGS. 4 and 5 illustrate for the purposes of explaining the operation of encyphering equipment forming part of the system, alternative circuit interconnections of a shift register.
Figure 5:
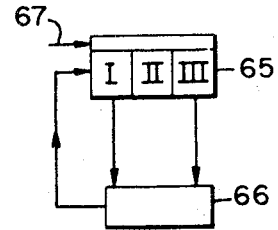

The security of the system as regards the dispensing of packets of banknotes is dependent upon the security of the 'approval' signal and the recognition of this at the terminal. The apparatus provided, both at the terminal and at the center, to achieve the encyphering and recognition of the approval signal involves a multistage of shift register used as a chain-code generator. FIGS. 4 and 5 illustrate the manner in which a shift register 65, having in this case three bistable stages only, may be used in this respect to provide a respective chain code that varies according to the feedback connections made. In the case of the arrangement shown in FIG. 4 the outputs of the second and third stages, II and III, are added together (without carry) in a half-adder 66 to provide the feedback, whereas in the case of the arrangement shown in FIG. 5 it is the outputs of the first and third stages, I and III, that are added. The digit "0" or "1" fed back is in each case entered in the first stage of the register during the next pulse of the shift-pulse sequence on lead 67, the code sequences achieved in the two cases, starting from the condition in which each stage I, II and III is in the "1" state, are:

| FIG. 4. | | | FIG. 5 | | |
|---|---|---|---|---|---|
| I | II | III | I | II | III |
| 0 | 1 | 1 | 0 | 1 | 1 |
| 0 | 0 | 1 | 1 | 0 | 1 |
| 1 | 0 | 0 | 0 | 1 | 0 |
| 0 | 1 | 0 | 0 | 0 | 1 |
| 1 | 0 | 1 | 1 | 0 | 0 |
| 1 | 1 | 0 | 1 | 1 | 0 |
| 1 | 1 | 1 | 1 | 1 | 1 |

In each case the register 56 is returned after seven shifts to its starting condition and so repeats the sequence recurrently. The condition of the register 65 at any particular time during operation depends upon three factors, namely, the feedback configuration, the number of shift pulses since commencement of operation, and the particular condition that existed at commencement. It is on the basis of these three factors that encyphering of the 'approval' signal takes place, this signal being generated in both the unit 55 and the unit 54 at the terminal and computer center respectively, from the cypher derived by the unit 55. The units 55 and 54 are of substantially the same construction as one another, the only significant difference lying in the fact that the unit 55 includes comparator and cypher-generating means not provided in the unit 54. The construction of the unit 55 is shown in FIG. 6.

Referring to FIG. 6, the cypher-generating means included in the unit 55 comprises a random number generator 70 that generates a random sequence of 16-digit binary numbers, and a selection unit 71 that is operative to select and store temporarily whichever number is being generated at the time when entry of the personal identification number into the store 43 is completed; it is the number selected by the unit 71 that is transmitted from the unit 55 to the computer center as the 16-digit binary cypher. The comparator means in the unit 55, on the other hand, is a comparator 72 that is operative to compare the 'approval' signal received from the computer center, with a representation of a 16-digit binary number generated within the unit 55 using the cypher in conjunction with a 16-stage shift register 73.

Each stage of the shift register 73 0connected via an individual gate 74 to a binary adder 75. The adder 75 supplies feedback to the shift register 73 in accordance with the least-significant binary digit of the sum accumulated, so in this way there is generated through successive shifts of the register 73, a chain code dependent upon which of the gates 74 is open and which closed. The 16 gates 74 are controlled individually by a feedback-programming unit 76 in accordance with the values, "0" or "1," of the 16 binary digits of the random number selected by the unit 71. Each individual gate 74 is controlled to be open or closed in dependence upon the value of a respective one of the 16 digits, the particular one being dependent upon the particular system of jumpering, that is to say cross connection, effected by means of a program card (not shown) inserted in the unit 76. This program card and the random number generated, accordingly determine in conjunction with one another the particular feedback-configuration used; the same feedback-configuration is achieved in the unit 54 at the computer center by using a duplicate of the program card in the feedback-programming unit (76) there, and effecting the operation of the associated feedback gates (74) in accordance with the transmitted cypher.

A cycle-program unit 77 is responsive to the number of shifts executed by the shift register 73 after the selection of a random number by the unit 71 and the consequent setting of the gates 74. After a programmed number of these shifts (for example, sixteen) the unit 77 responds to store the 16-digit binary number then held by register 73. It is with this number that comparison of the 'approval' signal received from the computer center takes place in the comparator 72. The 'approval' signal is in fact derived at the computer center from the cycle-program unit (77) of the encyphering unit 54, there being duplication at this cycle-program unit of the program used at the unit 77 in order that the same number of shifts are executed by the shift register (73) there, before response of the cycle-program unit. The 16-digit number selected and stored by this latter unit provides the encyphered 'approval' signal transmitted from the center after the various checks carried out by the units 50 and 52 are satisfied, and this signal is recognized by the encyphering unit 55 at the money-dispensing terminal only if the comparison effected by the comparator 72 reveals equality of this number with the number selected and stored by the unit 77. It is only in the event of such equality that the 'approval' signal can give rise to the 'dispense' signal supplied at the terminal to the gating unit 56.

The 'approval' number is derived at the computer center from the same cypher number as the 'comparison' number selected and stored by the unit 77, using the same feedback and cycle-programs, and accordingly there can be equality between the two numbers only if the shift registers at the terminal and center both start with the same setting. The initial setting of the shift register 73 at the terminal is effected by an entry-program unit 78 that enters a 16-digit binary number into the register initially upon each operation of the selection unit 71. The unit 78 and the corresponding entry-program unit at the computer center, may be arranged to enter the same programmed number into their respective registers for each transaction, but it is preferred instead to make the entered number dependent upon the account number of the particular card used for the transaction. The account number as read from the imprint of the card by the photoelectric reader 42 and stored in the store 43 at the terminal, is accordingly conveyed to the unit 78 for use there in deriving the number to be entered. At the center the corresponding entry-program unit, working to the same program as the unit 78, derives the same 16-digit binary number (for entry in its associated register) from the account number as transmitted from the store 43 to the unit 52.

With the form of customer's card described above with reference to FIG. 1, the pulse recordings carried by the high-coercivity magnetic oxide of the coating 2 are masked by 'noise' recorded in the low-coercivity magnetic oxide. Although the use of magnetic masking in this way provides an element of security it is certainly not an essential. In this latter respect, the coating 2 of the customer's card may consist of high-coercivity magnetic oxide alone, the pulse recordings being recorded in this material and being read by the head 31 in checking the authenticity of the card, as before. Although no masking is used in these circumstances, the magnetic-recording head 30 is preferably retained and energized with alternating current as before, since this ensures that a card cannot satisfy the authenticity check unless it carries magnetic material of sufficiently high coercivity. This applies whether or not the magnetic material on the card carries pulse recordings that would otherwise satisfy the check, since the action of the head 30 is to erase any recorded signal from material having a coercivity less than the predetermined, high value.

We claim:

1. Access-control equipment for selectively enabling access to a facility, comprising first means for receiving fully within the equipment an information-bearing token presented by a person seeking access to said facility, second means for reading from the received token information borne thereby, third means that is operable in dependence upon the information read from the token to enable access to said facility, fourth means for detecting whether the received token has a predetermined characteristic, the existence of said predetermined characteristic being a criterion of valid access, fifth means for receiving invalid tokens and retaining them out of reach of said person within the equipment, sixth means operable selectively in a first or second mode for transporting the read token away from the second means, said sixth means being operative in said first mode to transport the read token to return it to said person and in said second mode to transport the read token to said fifth means for retention thereby, and seventh means to operate said sixth means in said first mode to return the token to said person only in the event that said predetermined characteristic is detected by said fourth means and otherwise to operate said sixth means in said second mode whereby the token is retained within the equipment.

2. Access-control equipment according to claim 1 wherein said predetermined characteristic is magnetic characteristic.

3. Access-control equipment according to claim 1 wherein said fourth means includes a magnetic reading head for detecting whether the token carries a predetermined magnetic recording.

4. Access-control equipment according to claim 1 wherein said fourth means comprise erasure means for submitting the received token to a magnetic erasure process for erasing magnetic recording from any magnetic material having less than a predetermined level of coercivity, and detecting means for detecting magnetic recording remaining on the token after the token has been submitted to the erasure process, and wherein said equipment includes means to inhibit operation both of said third means and of said sixth means in said first mode in the event that a predetermined magnetic recording is not detected by said detecting means.

5. Access-control equipment according to claim 1 including manually operable means for entering into the equipment a plural-character word, the particular word entered being dependent upon manual selection, comparison means for detecting whether a predetermined correspondence exists between the information read from the token and the manually entered word, and means for enabling operation of said third means to enable access to said facility only in the event that said predetermined correspondence exists, said seventh means being means to operate said sixth means in said first mode independently of whether said predetermined correspondence exists.

6. Access-control equipment according to claim 1 wherein said predetermined characteristic is characteristic involved in the information read from the received token by said second means, said fourth means including means responsive to said information to detect whether said characteristic is present therein.

7. Access-control equipment according to claim 1 including token-entry means providing an entrance to the equipment for a presented token, said second means being spaced from said entrance, token-transport means for transporting along a path to said second means any token admitted to the equipment through said entrance, detector means positioned at a point along said path for detecting as the token passes that point whether the token has said predetermined characteristic, and inhibiting means operative to inhibit the said operation both of said third means and of said sixth means in said first mode, in the event that said predetermined characteristic is not detected by said detector means.

8. Access-control equipment according to claim 7 wherein said detector means is magnetic-reading means for detecting whether the transported token has a predetermined magnetic recording.

9. Access-control equipment according to claim 1 in combination with an item dispenser for dispensing items in response to each operation of said third means.

10. Access-control equipment for selectively enabling access to a facility, comprising token-entry means providing an entrance to the equipment for an information-bearing token presented to the equipment by a person seeking access to said facility, token-reading means for reading from the received token information borne thereby, said token-reading means being spaced from said entrance, bin means to receive tokens for retention within the equipment, token-transport means for transporting along a path to said token-reading means any token admitted to the equipment through said entrance, said token-transport means being operable following the reading of said information by the token-reading means to return the token through said entrance or, selectively, to drive the token from the token-reading means into said bin means, release means operable in dependence upon the information read from the token to enable access to said facility, detector means for detecting as the token passes along said path to said token-reading means whether the token has a predetermined characteristic, the existence of said predetermined characteristic being a criterion of valid access, and means responsive to detection of said predetermined characteristic by said detector means to operate said token-transport means to return the token through said entrance only in the event that said predetermined characteristic is detected and otherwise to operate said token-transport means to drive the token into the bin means.

11. Access-control equipment according to claim 10 wherein said detector means includes a magnetic-reading head positioned along said path for detecting whether the token carries a predetermined magnetic recording.

12. Access-control equipment comprising means providing an entrance to the equipment for an information-bearing token, token-reading means spaced from said entrance, means for transporting a token admitted to the equipment through said entrance to the token-reading means, said token-reading means being operative to read from a token transported there to information borne by the token, means operable manually for entering a number into the equipment, the particular number entered being dependent upon manual selection, release means selectively operable to provide a predetermined release to access function, comparison means for comparing a number dependent upon the information read from the token with the said number entered into the equipment to operate said release means as aforesaid in dependence upon whether a predetermined correspondence exists between the compared numbers, token-return means operable to return the token transported to said token-reading means to said entrance irrespective of whether or not said predetermined correspondence is detected, detector means separate from said comparison means for detecting whether the received token has validity, and means for inhibiting operation both of said release means and of said token-return means in the event that the said validity of the token is not detected by said detector means.

13. Access control equipment according to claim 12 including a dispenser for dispensing at least one item in response to each operation of said release means.

14. An item-dispensing system according to claim 13 wherein said predetermined characteristic is a magnetic characteristic.

* * * * *